April 16, 1968   C. B. MITCHELL   3,377,990
DISPOSABLE PACKAGE AND SANITARY STATION FOR ANIMALS
Filed May 23, 1966
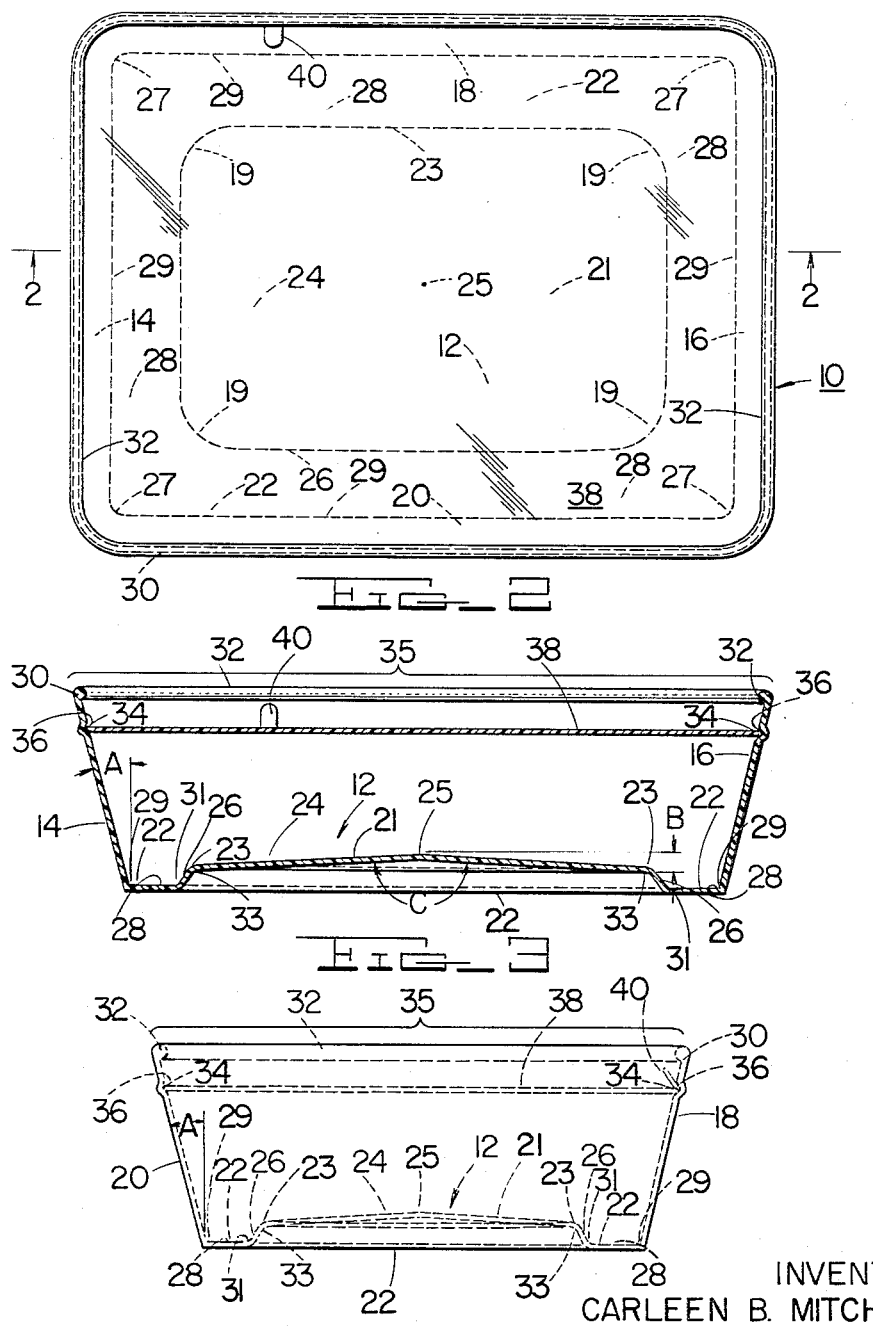
INVENTOR
CARLEEN B. MITCHELL
BY Wood, Gust & Irish
ATTORNEYS

United States Patent Office 3,377,990
Patented Apr. 16, 1968

3,377,990
DISPOSABLE PACKAGE AND SANITARY
STATION FOR ANIMALS
Carleen B. Mitchell, Ossian, Ind.
(615 Brookside Drive, Swanton, Ohio 43558)
Filed May 23, 1966, Ser. No. 551,982
11 Claims. (Cl. 119—1)

The present invention generally relates to a disposable package and a sanitary station for animals, and more specifically to a novel and self-packaging commode which is especially useful with small house pets, such as cats, puppies and the like.

One of the most objectionable aspects of keeping a house pet such as a cat or a dog is the maintaining of suitable toilet facilities, particularly in relatively crowded quarters, such as an apartment or hotel room. Especially where the animal is trained to use an indoor toilet station exclusively, there is the unpleasant task of keeping the station cleaned to prevent the development of offensive odors or other unhealthy conditions. This cleaning operation usually involves both removing the solid defecation from the toilet station and periodically changing the granular litter material used in the toilet station. Both sand and ground clay-type material have been used in toilet stations of this type.

The emptying, cleaning by washing and changing of the material of the station at regular intervals is necessary to maintain a normally habitable sanitary condition. However undertaken, this cleaning process is, and has always been, unpleasant. The routine changing of the material used in the animal station is made more arduous and the intervals between changes is shortened by the fact that the material used in the station will become moist and soggy if drainage for the liquid excrement of the animal is not provided by the station. While some prior devices have utilized screens to hold the material of the animal station above the bottom of the station to provide drainage, screens in general have proven unsatisfactory since the materials used in animal stations are not accurately sized, and thus, screens either allow some of the material to fall through the screens or do not provide the proper drainage when caked with the material of the station.

Further, since most animals instinctively paw around in the material of the animal station, prior animal stations have been known to be unsatisfactory for the reason that the material of the station is easily expelled from the station onto the adjacent floor area. Therefore, it is highly desirable to provide an improved animal station which provides drainage for the material contained therein, and has means tending to contain the material within the station during the scattering of the material by the pawing of the animal.

Since the cleaning of any relatively permanent animal station involves the periodic emptying of the station, and periodic washing of the station to maintain a normal habitable sanitary condition within the station, the cleaning operation of a relatively permanent animal station can at best result in a messy and unpleasant routine. For this reason, it is highly advantageous to provide a disposable sanitary animal station. Several disposable animal stations have been suggested. However, most of them are made of some form of relatively stiff paperboard which is made impervious to moisture by a treatment of the board. Such disposable sanitary stations are not very durable when the treatment given to the paperboard is only surface deep as a pawing animal within the station can scratch the surface of the litter material of the station. Thus, in use, the moisture-proof condition of the material of the station will be deteriorated. As soon as this occurs to any great extent, the animal station becomes both soggy and weak such that the station cannot support the contents thereof by itself much to the chagrin of the person attempting to move the station. Therefore, it is further highly desirable to provide a disposable animal station which does not weaken during use such that the station can be routinely picked up and disposed of without difficulty.

For the convenience of the animal owner, it is still further highly desirable to provide an animal station which can double as a package for the material used therein. This allows the animal owner to buy one item, i.e., the material of the station, and to use the material of the station in the package in which the material was purchased.

It is therefore the principal object of this invention to provide an improved animal station which can double for the package of the litter material used in the station.

Another object of this invention is to provide an improved animal station which provides drainage for the litter material used in the station.

It is yet another object of this invention to provide an improved animal station which provides means tending to contain the material of the station during the scattering of the material by an animal pawing in the material.

It is still another object of this invention to provide an improved, disposable animal station which is sufficiently durable to retain its strength for the life of the material contained therein such that the material and the station can be picked up and easily disposed of together.

A further object of this invention is to provide an improved sanitary station for animals which provides both drainage for the material used therein and means for containing the material within the station during the scattering of the material by the pawing of an animal.

Still further an object of this invention is to provide an improved disposable animal station which provides drainage for the material contained therein and means for containing the material during the scattering of the material by an animal, and further is sufficiently durable to retain its strength for the life of the material contained therein whereby the animal station and the material therein can be picked up and disposed of together.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a top view of the improved animal station and package of this invention;

FIG. 2 is a cross-sectional view of the improved animal station and package of this invention shown in FIG. 1, taken substantially along the section line 2—2 of FIG. 1; and FIG. 3 is an end view of the improved animal station and package illustrated in FIGS. 1 and 2.

In the broader aspects of this invention there is provided an improved animal station which can double as a package for the material used in the station comprising a box having means for draining and concentrating the animal excrement from a substantial portion of the material used in the station, and means for containing the material within the station during the scattering of the material by a pawing animal. The box is further made of a material which is sufficiently durable to retain strength during the use of the material contained in the box, which is adequate to support both the used material and the box, whereby the animal station and the material therein can be picked up and disposed of together.

Referring to the drawings, there is provided a box 10 having a bottom 12 and four upstanding sides 14, 16, 18, 20. Bottom 12 has a substantially flat portion 22 adjacent to the periphery thereof and a conical portion 24 in the center of the flat portion 22. Conical portion 24 has the geometric center 25 thereof raised above and spaced apart from the plane of the peripheral boundary 23. Thus, the surface 21 of the portion 24 slopes from the center and apex 25 downwardly toward the flat portion 22 at a substantially equal angle in every direction. The conical portion 24 is elevated above the flat portion 22 a distance which is less than the height of the sides 14 through 20. Conical portion 24 can be more specifically described by referring to an angle B between a horizontal plane coincident with the portion 24 at the apex 25 thereof and the upwardly facing surface 21 of the portion 24 or to an apex angle C. (See FIG. 2.) Conical portion 24 in plan view has a shape geometrically similar to bottom 12 except for the smoothly curved and rounded corners 19 thereof which have radii longer than the radii of the corners 27 of the box 10.

A smoothly curved and upwardly extending and continuous wall portion 26 extends between the flat portion 22 and the periphery 23 of the conical portion 24. Wall portion 26 is both spaced apart and in general parallelism with the upstanding sides 14 through 20. Wall portion 26, sides 14 through 20 and bottom portion 22 define a continuous trough 28 adjacent to the upstanding sides 14 through 20. Trough 28, as shown, has a substantially uniform transverse cross-sectional shape and size.

Sides 14 through 20 each upstand from the bottom portion 22 adjacent to the peripheral edge thereof and slope outwardly and away from the sides opposite thereto, respectively. The slope of each of the sides 14 through 20 can be more specifically defined by referring to the angle A between each of the sides and a vertical plane upstanding from the bottom portion 22 at the same position. (See FIG. 2.) Sides 14 through 20 define a top opening 35 having a shape geometrically similar to that of the bottom 12 and an area greater than the bottom 12. The top opening 35 is bounded by a continuous peripheral edge 30 of the sides 14 through 20. A continuous lip 32 is connected to the sides 14 through 20 adjacent to the peripheral edge 30. Lip 32 extends inwardly of said box and overhangs a portion of the sides 14 through 20. A continuous groove 34 is formed in the sides 14 through 20 at a position spaced apart and generally parallel to the lip 32. Groove 34 opens into the interior of box 10 and has a bottom 36 which defines a shape geometrically similar to the bottom 12 and the top opening 35 of the box 10 and having a size slightly less than the top opening 35 and greater than bottom 12.

A cover 38 is provided of resilient, flexible and self-supporting sheet material, and is shaped geometrically similar to the bottom 12 and the top opening 35 of the box 10 and of a size substantially equal to the shape defined by the bottom 36 of the groove 34. Cover 38 is also provided with a tab 40 secured thereto, the purpose of which will become obvious in the description following.

In a preferred embodiment, the sides 14 through 20 join the flat bottom portion 22 in a sharp corner 29, sides 14 through 22 are joined adjacent to the opposite ends thereof to each other at smoothly curved and rounded corners 27, upstanding wall portion 26 joins the conical portion 24 and the flat portion 22 at smoothly curved and rounded corners 31, 33 and the peripheral edges of conical portion 24 are joined at the opposite ends thereof at smoothly curved and rounded corners 19 having a radii larger than the corners 27 joining sides 14 through 20. The term "sharp corner" is used herein to denote a corner in which the material conventionally used in animal stations would likely collect. In contrast, the term "smoothly curved and rounded corner" is used herein to denote a corner having a radius sufficiently large to discourage the material of the animal station to become lodged therein. Both the "sharp corner" and the "smoothly curved and rounded corner" can easily be cleaned and the material used in the station removed therefrom by wiping.

In a specific embodiment of this invention, the box 10 is integrally formed of a flexible, non-brittle and self-supporting material which is impervious to moisture and has a strength sufficient to support both the box 10 and the animal station material contained therein both when fresh and when fully spent. Cover 38 is made of a material having the same properties as the material of box 10 above-described, upon which a design, advertisement, trademark or other indicia can be printed. A box 10 formed of polyethylene, polypropylene, or a like material and a cover 38 formed of relatively stiff paperboard is satisfactory. A specific embodiment further has the following dimensions:

| | |
|---|---|
| Length | 13 inches. |
| Width | 10 inches. |
| Height | 3 inches. |
| Angle A | 14 degrees. |
| Angle B | 3 degrees. |
| Angle C | 94 degrees. |
| Distance between cover 38 and bottom portion 22 | 2¼ inches. |
| Height of conical portion 24 at the apex 25 from the elevation of bottom portion 22 | 11/16 inch. |
| Radius of "smoothly curved and rounded" corners | ½ inch and longer. |
| Angle of "sharp corners" | About 105° and less. |
| Distance that lip 32 extends inwardly of sides 14 through 20 | About ⅛ inch. |

In operation, the box 10 can be filled to the height of the groove 34 with the material of the type which is conventionally used in animal stations, such as sand or clay-type material. Cover 38 can then be removably secured to the sides 14 through 20 in a position closing the top opening 35 by flexing the cover 38 and positioning the peripheral edge portions of the cover 38 within groove 34. In this position, cover 38 is immovable from the groove 34, and thus, is secured to the box 10 until the cover is again flexed to a degree which removes the peripheral edge portions thereof from the groove 34. The box 10, thus completely full of material, can be shipped, stored upon a shelf, either on edge or its side, and generally handled in a manner similar to packages of other and more conventional types without the cover 38 becoming dislodged from the groove 34 and without the box 10 splitting open and dumping the material therefrom.

Further, the box 10 can be relatively inexpensively manufactured by vacuum forming, ejection molding or a similarly relatively inexpensive technique to render the box 10 completely disposable. Thus, an animal owner merely has to purchase the box 10 with the material contained therein, remove the cover 38 by gripping the tab 40 and pulling on the tab 40 vertically upwardly so as to flex the cover 38 and remove the edge portions thereof from the groove 34, and use the box 10 and the material contained therein as an animal station in the conventional manner.

During use, both the liquid and solid defecation of the animal will tend to gravitate toward the trough 28. This result is achieved by the surface 21 of the conical portion 24 being sloped from the center 25 thereof downwardly toward the bottom portion 22 and the trough 28 in every direction. (The solid animal defecation is usually more dense than the conventional material used in animal stations, and thus, will tend to gravitate toward trough 28; both the pawing of the animal and periodic shaking of the animal station by the pet owner will speed up this process.)

This same result can equally be achieved so long as the surface 21 of the portion 24 slopes downwardly toward the trough 28 in all directions. Thus, in an embodiment different from that illustrated, portion 24 can be pyramidal or any other bulged or convex shape so long as surface 21 slopes downwardly from a point on surface 21 toward the trough 28 in all directions.

By this process, the material within the box 10 will remain relatively dry, free from defecation, and usable until the material is substantially spent. At this time, a new box 10 containing animal station material can be purchased, the cover 38 of the new box 10 removed as above-mentioned, and placed in closing position with respect to the used and consumed box 10. Thus enclosed, the consumed material and the used box 10 can be discarded together without causing a sanitation hazzard. Since the material of the box 10 is impervious to moisture and has sufficient strength to support the consumed material therein, even after an animal has used all of the material within the box 10, the box 10 can be picked up and transported with only ordinary care without having the box 10 fall apart.

Further, the box 10 and the material contained therein will function as an improved animal station. The material of the animal station will last for a longer time since the animal defecation will be concentrated into a relatively small portion of the material used therein, thereby providing that a substantial portion of the material will be free of defecation until the material is substantially spent.

Lastly, the material within the animal station will be substantially retained in the box 10 even when the animal using the station scatters it about by pawing in the material. This result is achieved by the combination of the outwardly sloping sides 14 through 20 and the lip 32. Most of the material being scattered will impinge upon the sides 14 through 20 and either be retained by the impingement against the lip 32 or the sides 14 through 20 themselves and the force of gravity acting thereon. Thus, the angle at which the sides 14 through 20 are disposed and the distance which the lip 32 extends into the interior of the box 10 is functionally significant and must be chosen in combination with each other and the height of the box 10 to give the most satisfactory results.

While there have been described above the principles of this invention in connection with specific apparatus, it is to be clearly understood that this description is made only by way of example and not as a limitation to the scope of the invention.

What is claimed is:

1. A combined litter material package and sanitary excrement station for animals comprising a container having first means for concentrating the animal excrement adjacent to the peripheral boundary of the container, said container having a bottom and a top opening, said top opening being larger than said bottom, and second means extending peripherally around said top opening and defining said top opening for containing a substantial portion of the litter material within the station during the scattering of the litter material by a pawing animal, whereby a substantial portion of the litter material used in the station will tend to be kept within the station and relatively free from animal excrement.

2. The package and station of claim 1 wherein said first means includes said bottom having first and second bottom portions, said first bottom portion being adjacent to the peripheral boundary of the station, said second bottom portion being elevated above said first bottom portion, said second bottom portion being between said first bottom portion and said top opening, said first bottom portion being between the peripheral boundary of the station and said second bottom portion.

3. A combined litter material package and sanitary excrement station for animals comprising a container, said container having a bottom and a top opening, said bottom having first and second bottom portions, said first bottom portion being adjacent to the peripheral boundary of the station, said second bottom portion being elevated above said first bottom portion, said second bottom portion being between said first bottom portion and said top opening, said first bottom portion being between the peripheral boundary of the station and said second bottom portion.

4. A combined litter material package and sanitary excrement station for animals comprising a box, said box having a bottom and four upstanding sides, said bottom having a substantially flat portion adjacent to the periphery thereof and an elevated portion in the center of said flat portion, said elevated portion being above and spaced apart from said flat portion a distance less than the height of said sides, said elevated portion having a surface which is bulged upwardly and which slopes from a position thereon downwardly toward said flat portion in every direction, and an upwardly extending and continuous wall portion extending between said flat portion and the periphery of said elevated portion, said wall portion being spaced apart from said upstanding sides thereby defining with said flat portion of said bottom a trough adjacent to said upstanding sides in which animal defecation will tend to collect, said sides extending upwardly from a peripheral portion of said flat bottom portion and sloping outwardly and away from the side opposite thereto thereby providing an open top having an area greater than said bottom, said open top being bounded by a continuous peripheral top edge of said sides, and a continuous lip connected to said sides adjacent to said peripheral edge thereof extending inwardly of said box, whereby the slope of said sides and said lip combine to tend to retain the contents of said box therein when said contents are scattered by an animal.

5. The package and station of claim 4 further comprising a cover which is removably securable to said sides to close said open top, thereby enclosing said box.

6. The package and station of claim 4 wherein said sides are joined adjacent to the opposite ends thereof at smoothly curved corners of said box, and wherein said continuous wall portion is smoothly curved between said elevated portion and said flat bottom portion.

7. The package and station of claim 5 wherein said cover is a sheet of resilient, flexible and self-supporting material, wherein said sides have a continuous groove formed therein in a spaced apart and generally parallel relation with said lip, said groove opening into the interior of said box and having a bottom which generally defines the shape and size of said cover, the peripheral edge portions of said cover being positioned in said groove by flexing said cover, said cover being immovable from said groove without subsequent flexing of said cover whereby said cover is removably secured to said sides in a position closing said open top.

8. The package and station of claim 5 wherein said box is integrally formed of a flexible, non-brittle and self-supporting material which is impervious to moisture, and wherein said cover is of a material upon which indicia can be printed.

9. The package and station of claim 8 wherein said elevated portion is generally pyramidal in shape.

10. The package and station of claim 8 wherein the outward slope of said sides is about 14 degrees from the vertical; said lip extends into said box a distance of about ⅛ inch; and wherein the apex angle of said conical portion is about 94 degrees.

11. The package and station of claim 10 wherein said elevated portion is generally conical in shape.

References Cited

UNITED STATES PATENTS

| | | |
|---|---|---|
| 2,963,003 | 12/1960 | Oberge et al. _____ 119—1 |
| 3,100,474 | 8/1963 | Schneider _____ 119—1 |
| 3,141,441 | 7/1964 | Russell _____ 119—1 |
| 3,233,588 | 2/1966 | Thomas _____ 119—1 |
| 3,310,031 | 3/1967 | Lowe _____ 119—1 |
| 3,332,397 | 7/1967 | Vander Wall _____ 119—1 |

ALDRICH F. MEDBERY, *Primary Examiner.*